United States Patent [19]
Kikinis

[11] Patent Number: 5,832,214
[45] Date of Patent: Nov. 3, 1998

[54] METHOD AND APPARATUS FOR DATA SECURITY FOR A COMPUTER

[75] Inventor: Dan Kikinis, Saratoga, Calif.

[73] Assignee: Elonex I.P, Holdings, Ltd., London, United Kingdom

[21] Appl. No.: 844,112

[22] Filed: Apr. 29, 1997

Related U.S. Application Data

[63] Continuation of Ser. No. 548,733, Oct. 26, 1995, abandoned, and a division of Ser. No. 490,625, Jun. 15, 1995, Pat. No. 5,623,597.

[51] Int. Cl.[6] .............................. G06F 13/00; H04L 9/00; H04K 1/00
[52] U.S. Cl. ........................... 395/188.01; 380/4; 380/25
[58] Field of Search ....................... 395/188.01, 187.01, 395/186; 380/4, 5, 24, 25

[56] References Cited

U.S. PATENT DOCUMENTS

| | | | |
|---|---|---|---|
| 4,757,533 | 7/1988 | Allen et al. | 380/25 |
| 4,942,606 | 7/1990 | Kaiser et al. | 380/4 |
| 5,012,514 | 4/1991 | Renton | 380/4 |
| 5,265,163 | 11/1993 | Golding et al. | 380/25 |
| 5,355,414 | 10/1994 | Hale et al. | 380/25 |
| 5,402,492 | 3/1995 | Goodman et al. | 380/25 |

OTHER PUBLICATIONS

Grech, Security Off the Shelf, PC–Computing, Sep. 1992, at 246.

Somerson, Spy–proof Your PC: 13 Ingenious Ways to Keep Your System Secure, PC–Computing, Sep. 1992, at 218.

*Primary Examiner*—Robert W. Beausoliel, Jr.
*Assistant Examiner*—Norman M. Wright
*Attorney, Agent, or Firm*—Donald R. Boys

[57] ABSTRACT

A secure password log-in system for a computer having a keyboard with a keyboard data link to a keyboard controller comprises a data diverter circuit interposed in the keyboard data link between the keyboard and the keyboard controller; a boot read-only memory (ROM) having at least one pre-stored password for comparison with a password entered by a user; a boot controller connected to the boot ROM; and a bypass data link between the data diverter circuit and the boot controller. The boot controller, executing a boot routine from the boot ROM, causes entered keystrokes constituting a password to be diverted via the bypass data link to the boot controller.

8 Claims, 7 Drawing Sheets

METHOD AND APPARATUS FOR DATA SECURITY FOR A COMPUTER

CROSS REFERENCE TO RELATED APPLICATIONS

This is a continuation of application Ser. No. 08/548,733 filed Oct. 26, 1995 now abandoned, and is a divisional continuation of application 08/490,625, filed Jun. 15, 1995 now U.S. Pat. No. 5,623,597, incorporated herein by reference.

FIELD OF THE INVENTION

The present invention is in the area of methods and apparatus for computer-data security, and is particularly relevant to protection from password theft and fire.

BACKGROUND OF THE INVENTION

Most companies that use computers use electronic storage systems to store large quantities of valuable information. These storage systems typically record information on magnetic or optical media. Unfortunately, such memory systems are relatively fragile. That is, information recorded on media may easily be lost by excessive heat or mechanical abuse. Since much of the information residing on such media may be crucial to a company's business, it must be protected from destructive forces and fire.

A common method for preventing catastrophic loss of information is to copy the contents of a computer-resident data-storage system at regular intervals onto a magnetic tape. This magnetic tape, commonly referred to as backup tape, is then stored in a safe place away from a company's premises. Even with regular backup, however, large amounts of information may be added to a computer-resident data-storage system between backup intervals. Consequently, a fire, earthquake or other catastrophe that occurs between backup intervals could still destroy a significant amount of information.

In addition to the dangers of a physical catastrophe, unauthorized access to classified information also can ruin businesses and harm individuals. For this reason, classified information residing on a computer-resident data-storage system must be protected from theft. Typically, anti-intrusion systems use one or more passwords to safeguard data in a computer system from theft.

Even with password systems, however, data is not perfectly secure. Systems may still be readily compromised by individuals, skilled in the computer arts, who are able to obtain passwords by placing smart software (virus) in a location on a computer, such as in its operating system, wherein the software may be operated transparent to a user. Such software may be considered a snooping routine.

Typically, snooping routines are designed to intercept passwords that are entered by means of a keyboard, and to store captured passwords in an address space where they may be retrieved by an intruder. The intruder may, at a convenient time, retrieve one or more passwords, and use them subsequently to access classified information.

A serious problem with snooping routines is that individuals who are skilled in the art only need one time access to a local hard disk to capture all disk-resident passwords and gain unlimited access to classified information.

What is clearly needed is a security system that can defeat both the physical hazards of shock and fire, and potential intrusion with password capturing routines.

In one aspect, a unique system according to the present invention defeats a snooping routine by avoiding the usual path and protocol for entering passwords. In this aspect, the system of the invention acts as a password diverter, and is active only when a password is requested by a boot routine.

In another aspect, to safeguard data against shock or fire, a system according to an embodiment of the present invention has a fireproof data safe that is equipped with apparatus that regulates the internal temperature of the safe. The fireproof data safe contains a data-storage device, such as a hard disk drive, that communicates with a host computer system by means of a high-speed serial communication link. In the event of fire or other catastrophe, the data storage unit in the fireproof data safe protects data it contains from theft and, for at least a significant time, from heat generated by a fire.

SUMMARY OF THE INVENTION

According to a preferred embodiment of the invention, a secure data storage system for a computer is provided, comprising a fireproof safe; a heat sink structure within the safe; a heat transfer system connected to the heat sink structure and to a wall of the safe for transferring heat from the heat sink structure to outside the safe; a data storage unit within the safe, mounted to the heat sink structure, and connectable by a data link to a computer for data transfer; and a thermostat controller mounted outside the safe; wherein the thermostat controller, detecting a temperature outside the safe indicative of a fire, causes the heat transfer system to cease transferring heat from inside the safe to outside the safe and blocks passage of heat from outside the safe to inside the safe via the heat transfer system.

In various embodiments, the heat transfer system may be either passive or active. In one embodiment a passive heat transfer system comprises an uninsulated portion of a wall of the safe where the heat sink structure makes contact with the wall of the safe causing heat produced by the data storage system to be transferred across the safe wall and radiated into the surroundings. When a temperature indicative of a fire is detected, the heat sink structure is withdrawn from the wall of the safe, and insulative material is injected into the gap caused by the withdrawal. At the same time, coolant may be injected to cool the contents of the safe to better withstand the effects of a fire.

In another aspect of the invention, a secure password log-in system for a computer having a keyboard with a keyboard data link to a keyboard controller is provided, comprising a data diverter circuit interposed in the keyboard data link between the keyboard and the keyboard controller; a boot read-only memory (ROM) having at least one pre-stored password for comparison with a password entered by a user; a boot controller connected to the boot ROM; and a bypass data link between the data diverter circuit and the boot controller; wherein the boot controller, executing a boot routine from the boot ROM, causes entered keystrokes constituting a password to be diverted via the bypass data link to the boot controller.

Password diversion according to various embodiments of the present invention provides an heretofore unavailable level of security for passwords assigned to activate computer systems, by ensuring that entered passwords are never written to a bus structure, and therefore never available to be copied. A fireproof safe according to various embodiments of the present invention provides a new level of security for stored data.

DESCRIPTION OF THE PREFERRED EMBODIMENTS

General Description

Figure 1:
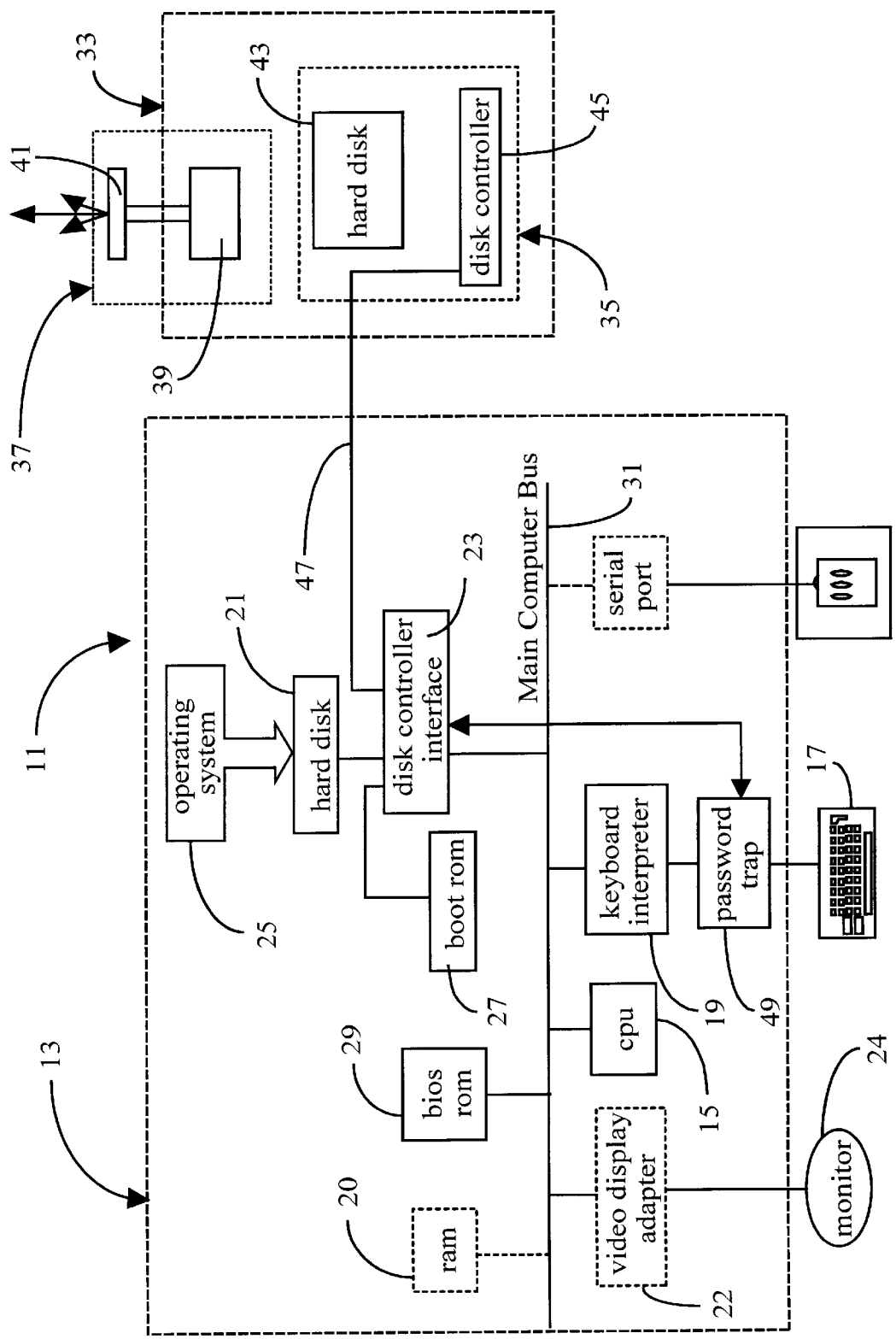
FIG. 1 is a block diagram showing a secure data-storage system according an embodiment of the present invention.

FIG. 1 is a block diagram illustrating a computer system 11 comprising a secure data storage system for use in protecting stored information from theft, fire and other catastrophe, according an embodiment of the present invention. Computer system 11 comprises a customized fireproof data safe 33 and a host computer 13 having well-known elements, including a central processing unit (CPU) 15, a keyboard 17, a keyboard interpreter (keyboard controller) 19, a local hard disk drive 21, a system random access memory (RAM) 20, a video display adapter 22, a video monitor 24, a disk interface controller 23, an operating system 25, a boot read-only memory (ROM) 27, a basic input/output system (BIOS) ROM 29, and a computer bus 31 connecting the digital components listed, as is known in the art. In a preferred embodiment, boot ROM 27 is connected directly to disk interface controller 23.

Fireproof data safe 33 contains a data-storage system 35 and a cooling system 37. The cooling system has a heat exchanger 39 inside the safe and a radiator 41 outside the safe. Data-storage system 35 in this embodiment comprises a hard disk 43, and a disk controller 45, which communicates by means of a high-speed serial communication link 47 with disk interface 23 in computer 13. Those with skill in the art will recognize that the technology of high-speed serial communication is known in the art, and that this portion of the present invention may be implemented with little difficulty by those with skill in the art, using well-known equipment and techniques. Also, hard disk drive 43 is representative, and could also be a disk drive array, or another form of mass storage.

Safe 33 has a lining of thermally insulating material along the inside walls to retard penetration of thermal energy into the interior of the safe in case of fire. Similarly, this thermal lining retards passage of thermal energy generated by information storage system 35 to the exterior of fireproof data safe 33. However, if excess thermal energy is not removed from safe 33, the interior temperature will rise over time and eventually exceed the maximum operation temperature for data-storage system 35.

In case of fire, fireproof data safe 33 can, for an extended period of time, prevent overheating of the hard disk and other elements within the safe, and thereby prevent catastrophic loss of stored data.

In the embodiment of the present invention shown in FIG. 1 a password diverter 49 is imposed in the data link between keyboard 17 and keyboard interpreter 19. During computer start-up, at the time a password is requested from the user, password diverter 49 prevents keyboard entries from passing through keyboard interpreter 19 to reach computer bus 31. As a result any snooping routine loaded onto computer 11 for monitoring bus 31 cannot capture keyboard entries and, therefore, cannot yield passwords. Password diverter 49 and its interactions with disk controller 23 and keyboard interpreter 19 is described more fully below.

Passive Cooling System

Figure 2:
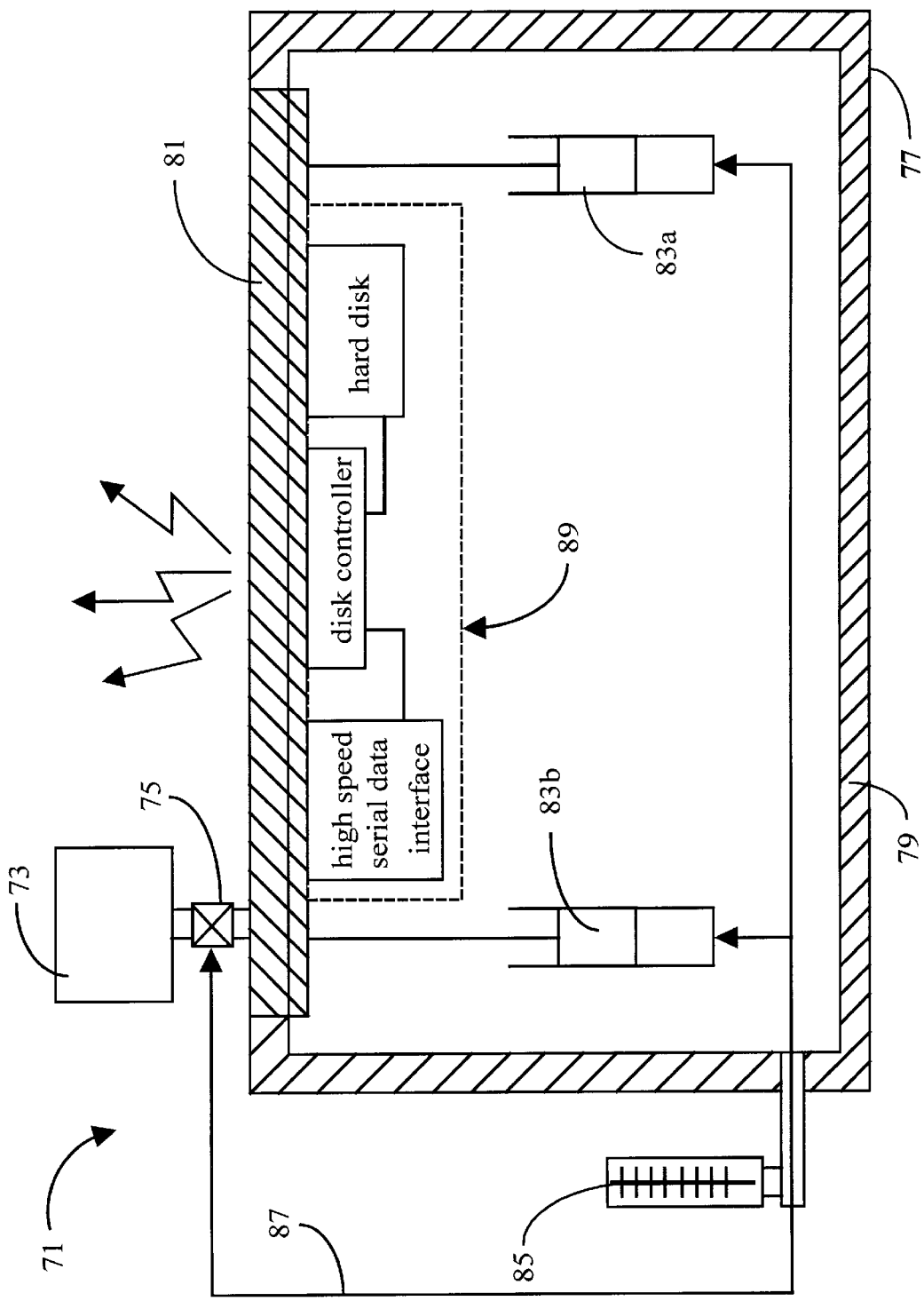
FIG. 2 is a schematic drawing of a passive cooling system according an embodiment of the present invention.

FIG. 2 is a schematic drawing of a passive cooling system as applied to a fireproof data safe 71 according to an embodiment of the present invention. The system comprises a metal enclosure 77, a thermal insulator 79 applied to inside surfaces of the metal enclosure, a heatsink plate 81, a heatsink retractor mechanism (83a, 83b), a thermostat 85, a thermal-insulation dispenser 73 wherein thermally-insulating material in an injectable form is maintained under pressure, and a remotely operable valve 75.

Thermally-insulating material 79 is discontinuous in one area occupied instead by a heatsink plate 81, to which a data storage unit 89, comprising a serial interface, a disk controller, and a hard disk drive, is mounted in a manner that allows waste heat generated by the data storage unit to be transferred to the heat sink plate.

Heatsink plate 81 is made of thermally-conductive material such as, but not limited to, copper or aluminum. The surface on one side of heatsink 81 is in direct contact with metal enclosure 77 without intervention of thermally-insulating material 79. As a result of this physical arrangement, waste heat generated by data-storage system 89 propagates through heatsink 81 and metal enclosure 77, and is radiated into the outside environment.

Thermostat 85 is located outside metal enclosure 77. If outside temperature rises, as a result of, for example, a fire, to a level that might lead to loss of data on data-storage system 89, thermostat 85 activates heatsink retractor (83a, 83b) and opens valve 75 by means of a signal path 87. As a result, heatsink retractor 83a and 83B moves heatsink 81 away from metal enclosure 77. At the same time, valve 75 opens and dispenser 73 injects thermally-insulating material into the volume created between heatsink 81 and metal enclosure 77.

The result of retraction of the heatsink plate and injection of material by dispenser 73 is a continuous layer of thermally-insulating material surrounding data storage unit 89 to protect the data storage unit from heat of the fire outside the enclosure.

It will be apparent to those with skill in the art that a heatsink may be manipulated by various methods. That is, it might be moved away from metal enclosure 77 by means of remotely controlled electromagnetic or hydraulic devices and the like, and also by other remotely-operable mechanical mechanisms.

Figure 3:
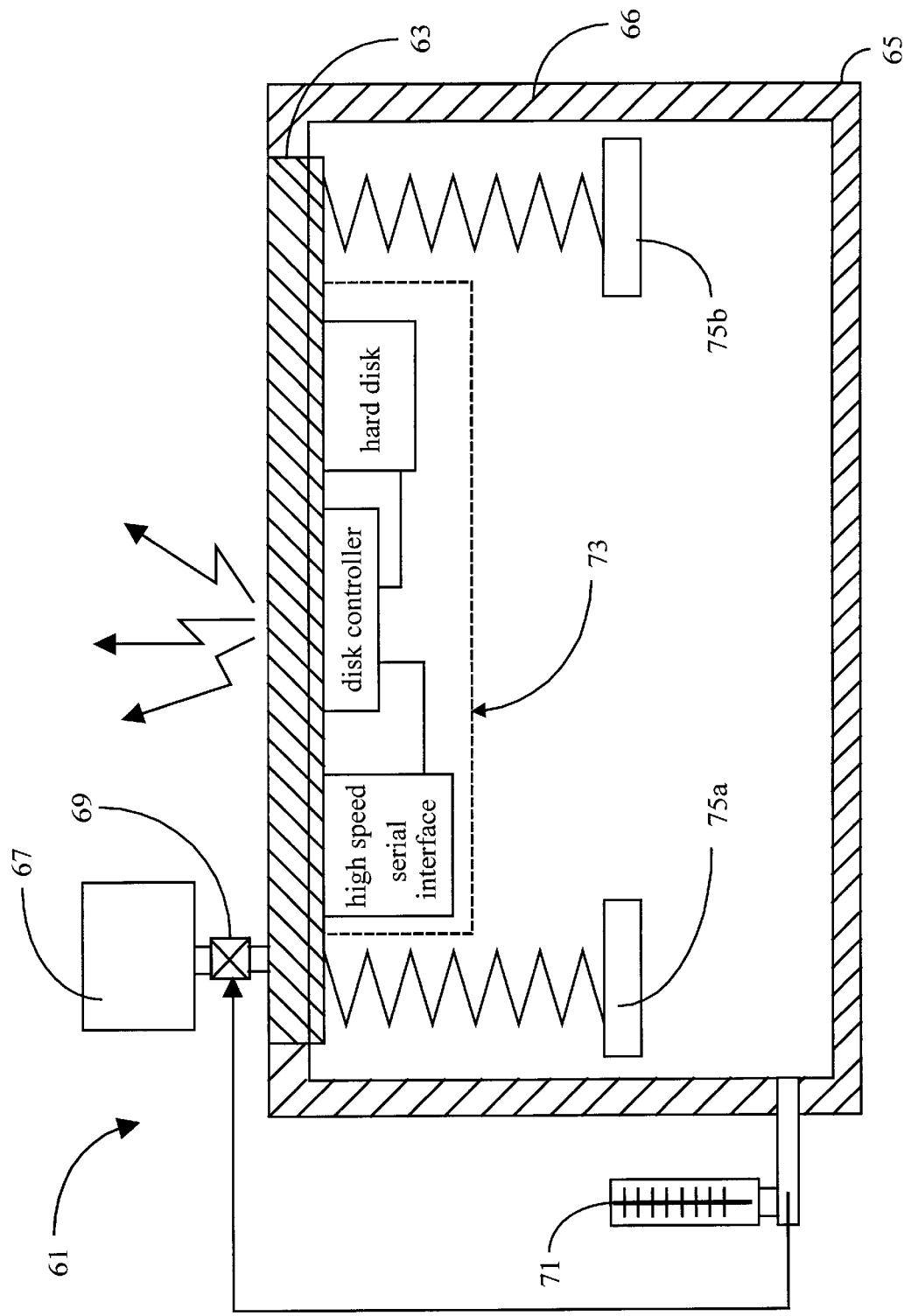
FIG. 3 is a schematic drawing of an alternate passive cooling system according an embodiment of the present invention.

FIG. 3 is a schematic drawing of a fireproof data safe 61 according an alternative embodiment of the present invention. In this embodiment a heatsink 63 is kept in contact with a metal enclosure 65 thorough an opening in thermally-insulating material 66 by a pair of springs 75a and 75b. In the event of fire, a valve 69 is remotely opened by a thermostat 71, and thermal-insulating material contained under pressure in a dispenser 67 is injected between heatsink 63 and metal enclosure 65.

In this alternative system, the pressure of injection forces heatsink 63 away from metal enclosure 65. As a result, a data-storage system 73 in intimate contact with heat sink plate 63 is entirely enclosed by thermal-insulting material. In case of fire, heatsink 63 must maintain a temperature that is safe for data-storage system 73 and must maintain that temperature until the fire can be extinguished.

Active Cooling System

Figure 4:
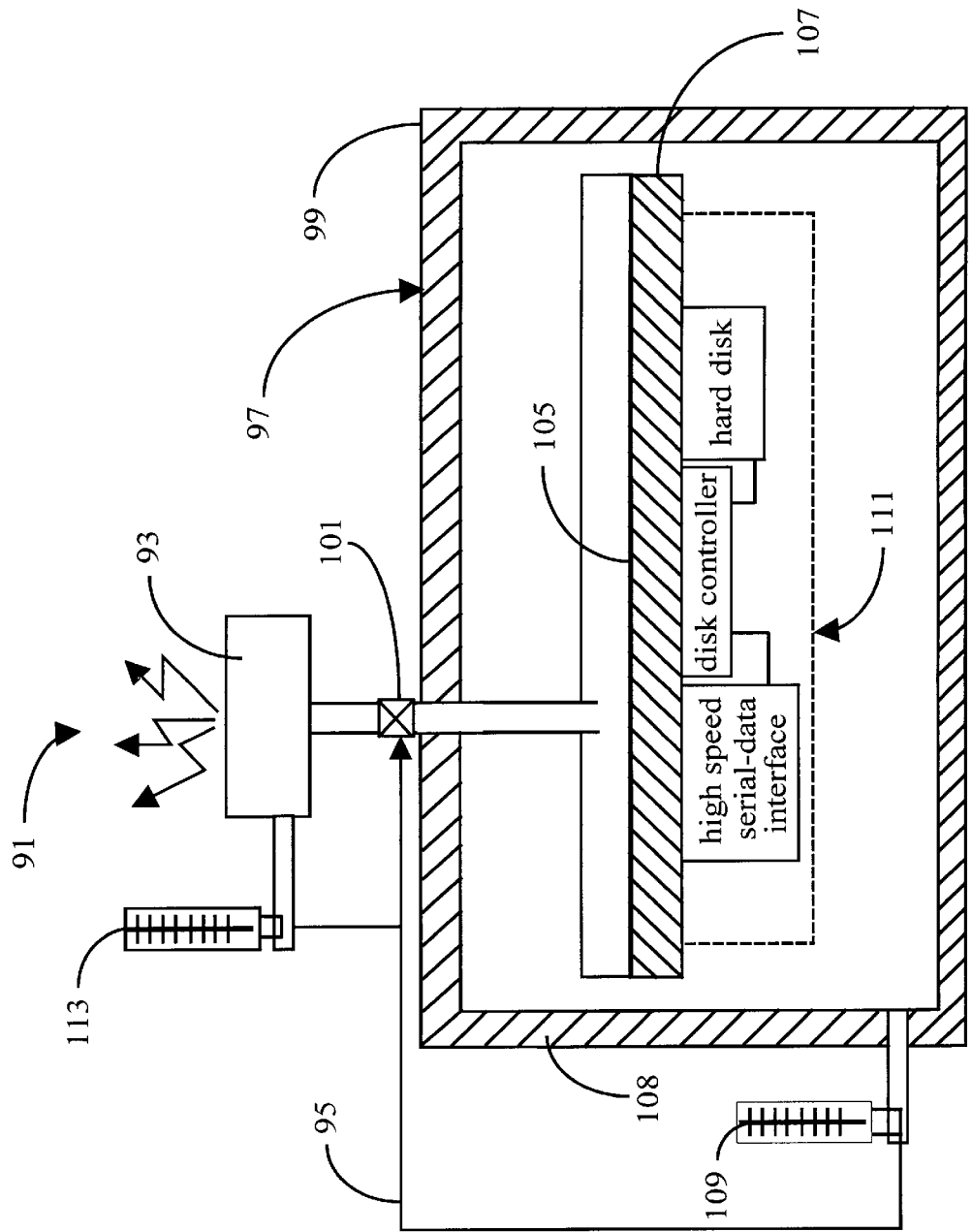
FIG. 4 is an alternate schematic drawing of an active cooling system according an embodiment of the present invention.

FIG. 4 is a schematic drawing of a fireproof data safe 91 according to another alternative embodiment of the present invention. Exemplary active cooling systems well known to those with skill in the art are those that use fall of temperature associated with an expanding gas or the cooling phenomenon of the Peltier effect.

Active cooling system 91 comprises a metal enclosure 99 lined with a thermally insulating material 103, a thermostat 109 used to sense the temperature of the environment, a thermostat 113 used to sense the temperature of a coolant, a radiator 93, a valve 101, a heatsink 107, and a heat exchanger 105. Metal enclosure 99 is a hermetically sealed structure made of thermally conductive material such as, but not limited to, steel or aluminum. Heatsink 107 is made of thermally-conductive material such as, but not limited to, copper or aluminum.

One side of heatsink 107 is in contact with heat exchanger 105 and the other side of heatsink 107 is in contact with a data-storage system 111 in a manner such that waste heat produced by the data storage system is transferred into heat sink plate 107. A liquid coolant, urged through heat exchanger 105 and radiator 93, carries thermal energy generated by data-storage system 111 to radiator 93 where it radiates into the environment.

It will be apparent to those with skill in the art that a carrier that transfers thermal energy is not limited to a liquid such as water or to a gas such as freon and ammonium. Thermostat 109 is mounted outside enclosure 99 and controls valve 101 through signal line 95. In the event of fire, thermostat 109 detects rising temperature and closes valve 101. As a result, coolant no longer circulates and therefore cannot carry thermal energy from a fire to heatsink 107, which might overheat components of data-storage system 111.

If thermostat 113 senses a change in coolant temperature it adjusts valve 101 to compensate for the temperature change. Those with skill in the art will recognize that a temperature controller for cooling fluid is old in the art, and that this portion of the present invention may be implemented with little difficulty by those with skill, using well-known equipment and techniques.

It will be apparent to those with skill in the art that there will be many alterations that might be made in the embodiments of the invention described herein without departing from the spirit and scope of the invention.

Password Security

Figure 5:
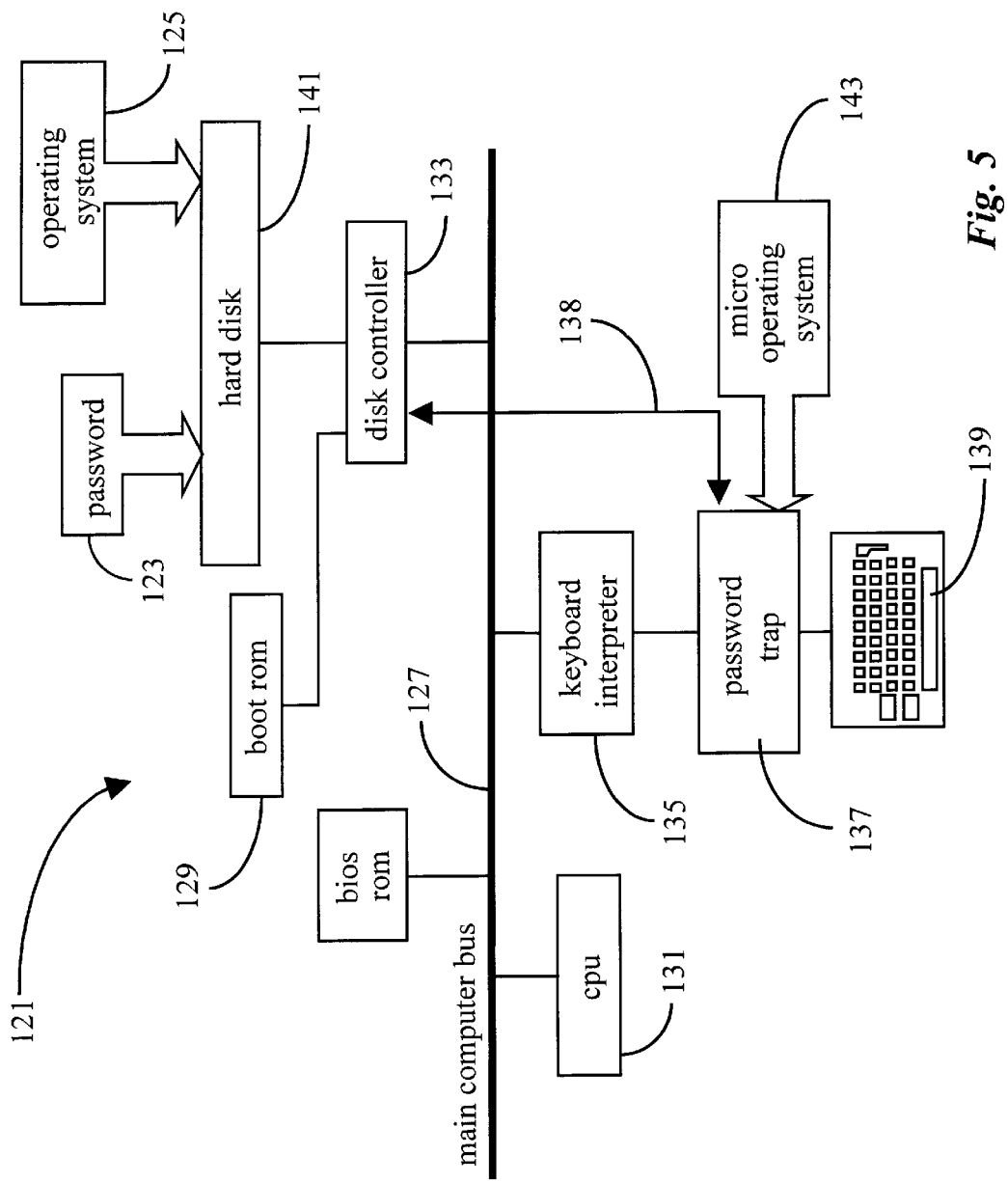
FIG. 5 is a schematic drawing illustrating a password diverter according an embodiment of the present invention.

FIG. 5 is a schematic representation of internal elements of a computer system according to the present invention comprising a password diverter. Computer 121 comprises, but is not limited to, a CPU 131, a main computer bus 127, a keyboard 139, a password diverter 137, a keyboard interpreter 135, a disk controller 133, a local hard disk 141, a disk operating system 125, and a boot ROM 129.

In the event a snooping routine is planted in the computer system, it will typically be designed to read keyboard entries from main computer bus 127 during at least the time frame that a password might be sought by execution of a boot routine, and to store the result in memory space, typically little-used memory space, for later retrieval. To intercept and divert keyboard entries during at least a portion of initialization on boot up to disk controller 133, password diverter 137 is imposed between keyboard 139 and keyboard interpreter 135 as shown.

Because of this electronic barrier, keyboard entries can not reach main computer bus 127 by means of keyboard interpreter 135 during the time that one or more passwords are prompted from a user. During this time, no keyboard entries may be captured and recorded by operation of a previously loaded snooping routine.

In operation a boot routine executed from boot ROM 129 has commands for setting and resetting password diverter 137 via a control signal in line 138 activated from controller 133. Line 138 is a two-way communication line, serving both to control diverter 137, and to deliver diverted password to controller 137.

Figure 7:
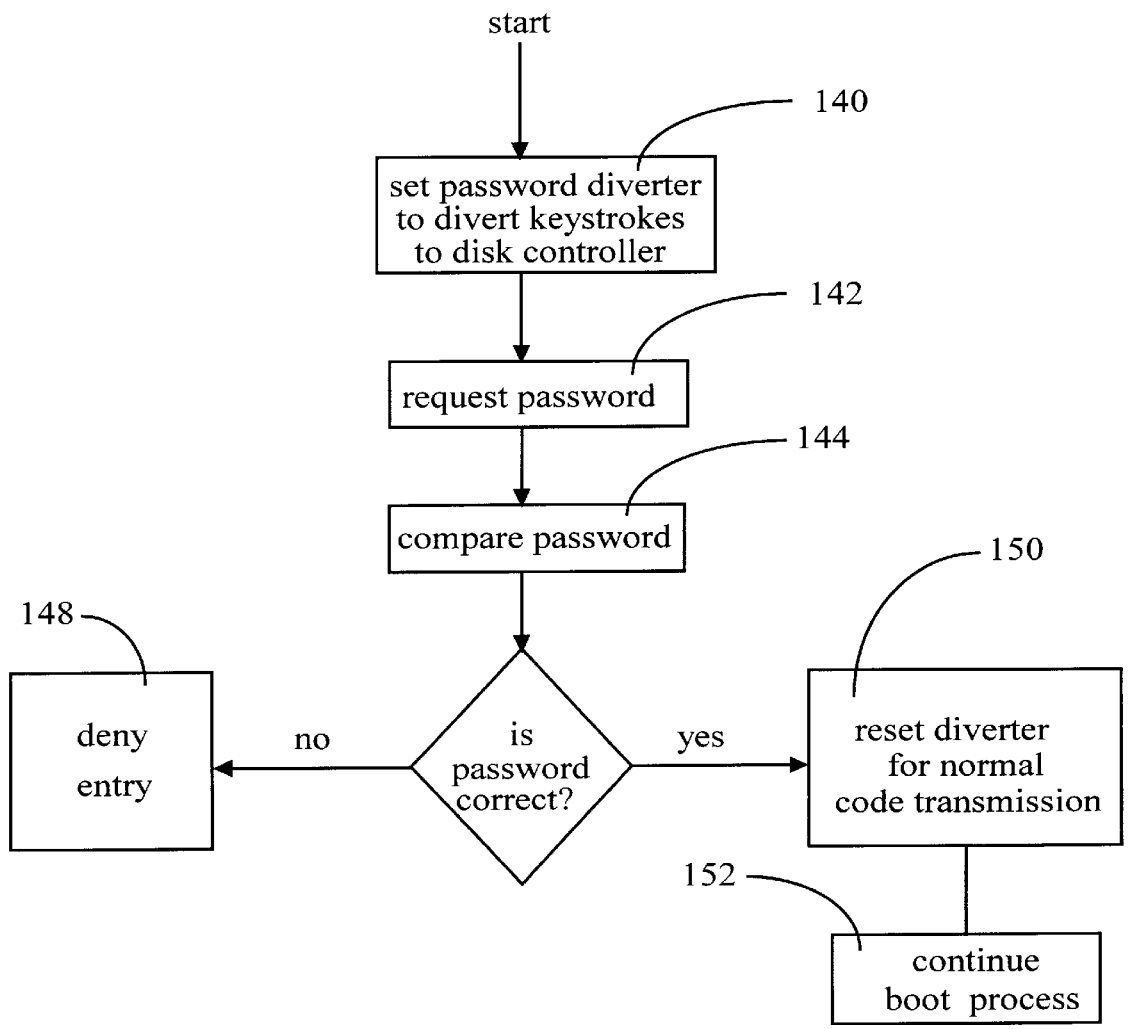
FIG. 7 is a flow diagram depicting steps in a portion of operation of the boot routine.

FIG. 7 is a logic flow diagram depicting steps in a portion of operation of the boot routine wherein the password diverter is switched and a password is entered and checked. Entries at keyboard 139 are normally directed through diverter 137 to keyboard controller 135 just as though the diverter were not there. Just before a password is requested, at step 140, controller 133 signals password diverter 137 to transmit keystroke code to controller 133 via link 138. At step 142 the system requests a password from the user. This request is typically posted on the video display, as is conventional.

When (and if) the user enters a password, the keystrokes are sent to controller 137 rather than to keyboard controller 135, thereby bypassing computer bus 127. At step 144 an entered password is compared with valid passwords stored in boot ROM 129. At step 146 it is determined if an entered password is a valid password. If not, control goes to step 148, and entry is denied. A message may be displayed that the entered password was invalid, and the user may be given an opportunity to try again. The appearance of the operation is just as though there were no diversion from normal operation.

If an entered password is valid, diverter 137 is reset at step 150 to transmit keystroke codes to keyboard controller again, and not to controller 133. The boot process continues at step 152.

Password diverter 137 is an IC switching circuit acting as a remotely switchable data "T" connection in the data link between the keyboard and the keyboard controller. It will be apparent to those with skill in the art that there are many alternative ways that such a diverter may be implemented, either as an application specific integrated circuit or as a circuit of connected discrete devices. The implementation of such a circuit is a routine operation for those with skill in the art, and it is the functionality of the circuit with other elements of the computer and the firmware of the boot device that is inventive in this embodiment of the invention.

Figure 6:
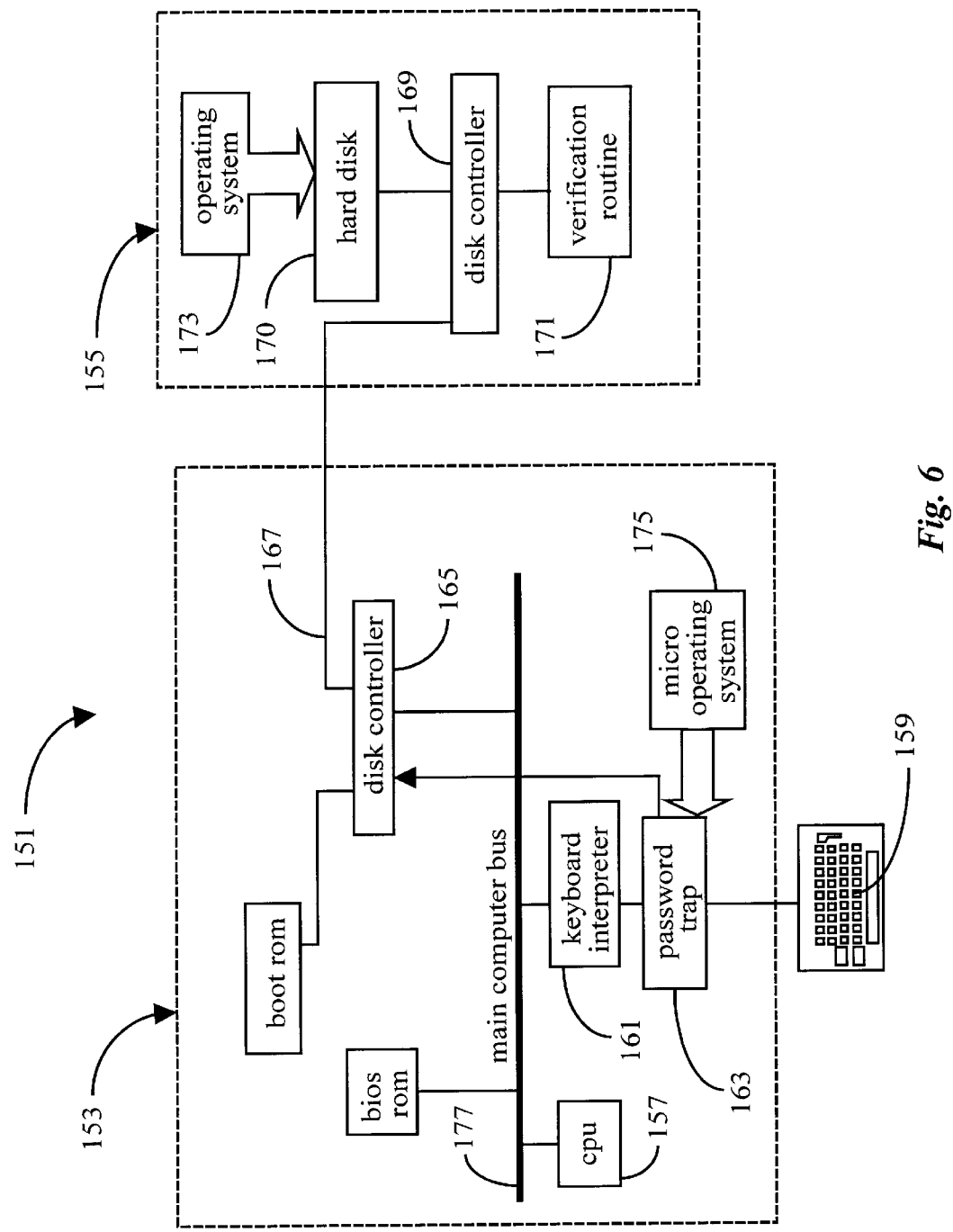
FIG. 6 is a schematic representation of a password-secured, fire and theft-proof data-storage system according an embodiment of the present invention.

FIG. 6 is a schematic representation of a password-secured, fire and theft-proof computer system 151 according to yet another embodiment of the present invention. Computer system 151 comprises a fire-proof data safe 155, and a high-speed serial communication link 167, and a secure computer 153, having well-known elements of a computer, including, but not limited to, a CPU 157, a computer bus 177, a keyboard 159, a keyboard interpreter 161, a password diverter 163, and a disk controller 165.

In this embodiment of the present invention a data-storage system inside the fireproof data safe comprises a disk controller 169, and a hard disk 170. Data exchange between computer-resident disk controller 165 and safe-resident disk controller 169 is accomplished by means of a high-speed serial communication link 167.

In this embodiment a verification routine is provided in the form of firmware such as EPROM, PROM, ROM or the like, and the verification routine might be part of, but is not restricted to, disk controller 169. In this embodiment of the present invention, a disk operating system 173 is stored on, but not restricted to, safe-resident hard disk 169. A microoperating system 175, as described above, is part of electronic circuitry of password diverter 163 and might take the form of firmware such as EPROM, PROM, ROM or the like.

It will be apparent to those with skill in the art that there will be many alterations that might be made in the embodiments of the invention described herein without departing from the spirit and scope of the invention. There are, for example, many alternative ways a fireproof safe might be provided, and there are also many ways that active and passive cooling systems can be implemented for such a safe. There are likewise many alternative embodiments for a password diverter as disclosed above.

What is claimed is:

1. A secure password log-in system for a computer having a keyboard with a keyboard data link to a keyboard controller and also having an internal bus, comprising:

a data diverter switch interposed in the keyboard data link between the keyboard and the keyboard controller;

a boot read-only memory (ROM) having at least one pre-stored password for comparison with a password entered by a user;

a boot controller connected to the boot ROM; and a bypass data link between the data diverter circuit and the boot controller;

wherein the boot controller is adapted to control the diverter switch and the boot controller, executing a boot routine from the boot ROM, controls the diverter switch to cause entered keystrokes constituting a password to be diverted via the bypass data link to the boot controller for comparison with the prestored password.

2. A secure password log-in system as in claim 1 wherein the boot controller, after receiving a password entered at the keyboard, compares the entered password with valid passwords stored in the boot ROM, and, upon finding a match, switches the data diverter switch to transmit keystrokes again to the keyboard controller.

3. A secure password log-in system as in claim 1 wherein the boot controller is also a read/write controller simulating a data interface to a local hard disk, while actually transmitting data via a serial link to a remote data storage system.

4. A computer comprising:

a CPU;

a communication bus connected to the CPU;

a keyboard;

a keyboard controller connected to the communication bus;

a data diverter switch connected by a data link to the keyboard controller and to the keyboard;

a boot controller connected to the communication bus; and a bypass data link between the data diverter and the boot controller, the bypass data link bypassing the communication bus;

wherein the boot controller, as a portion of a boot procedure, requests a password to be entered at the keyboard, and switches the data diverter circuit to divert subsequent keystrokes constituting the password to the boot controller via the bypass data link.

5. A computer as in claim 4 wherein the boot controller, after diverting password keystrokes, compares the diverted password to prestored passwords, and, on finding a match, switches the data diverter to transmit keystrokes again to the keyboard controller.

6. A computer as in claim 4 wherein the boot controller is also a read/write controller simulating a data interface to a local hard disk, while actually transmitting data via a serial link to a remote data storage system.

7. A method for ensuring security of passwords for activating a computer system having a keyboard connected by a keystroke data link to a keyboard controller, comprising steps of:

(a) imposing a remotely operable data diverter switch in the keystroke data link between the keyboard and the keyboard controller;

(b) requesting a password to be entered at the keyboard; and (c) switching the data diverter switch to divert keystrokes comprising a password to a special controller, bypassing the keyboard controller.

8. The method of claim 7 further comprising steps for comparing an entered password by means of the special controller with prestored passwords, and, upon finding a match, switching the data diverter to route keystrokes again to the keyboard controller.

\* \* \* \* \*